US006918712B2

United States Patent
Boyce

(10) Patent No.: US 6,918,712 B2
(45) Date of Patent: Jul. 19, 2005

(54) ADJUSTABLE POSITION RETAINING/ MOUNTING APERTURE

(75) Inventor: Dean Arden Boyce, Waterloo, IA (US)

(73) Assignee: Deere & Company, Moline, IL (US)

( * ) Notice: Subject to any disclaimer, the term of this patent is extended or adjusted under 35 U.S.C. 154(b) by 145 days.

(21) Appl. No.: 10/656,788

(22) Filed: Sep. 5, 2003

(65) Prior Publication Data

US 2005/0053425 A1 Mar. 10, 2005

(51) Int. Cl.[7] ............................................. B65G 13/02
(52) U.S. Cl. .................................... 403/280; 403/408.1
(58) Field of Search ................................ 403/279, 280, 403/408.1

(56) References Cited

U.S. PATENT DOCUMENTS

| 5,415,272 | A | * | 5/1995 | Boschert et al. | ............ | 198/780 |
| 6,135,425 | A | * | 10/2000 | Platt | ............................ | 256/66 |
| 6,837,009 | B1 | * | 1/2005 | Roth | ......................... | 52/167.1 |
| 2004/0190987 | A1 | * | 9/2004 | Yang | ......................... | 403/348 |

* cited by examiner

Primary Examiner—John R. Cottingham

(57) ABSTRACT

An adjustable position retaining/mounting aperture is provided having an elongated slot, a pair of retaining arms, and a spring. One wall of the elongated slot has a plurality of depressions and ridges, this scalloped wall also forms an upper wall of the retaining arms. The retaining arms are mirror images of one another, with each having a wide main body portion and a narrow neck portion. The aperture is designed for use with plastic materials and, as such, the narrow neck portions of the arms serve as living hinges allowing the main body portions to flex within the aperture. The spring is adjacent to the retaining arms and comprises a thin strip of material in the form of an arch which flexes when one of the retaining arms is deflected enough to make contact with the spring. The arch shape of the spring tends to urge the retaining arms back to their original position. A fastener inserted in the aperture can be moved, for purposes of adjustment, by sliding the fastener in the slot causing it to ride up one of the adjacent ridges. When the fastener rides up the ridge the retaining arm flexes at the neck portion and is deflected into contact with the spring causing it to deflect. As the fastener moves over the ridge and is seated in the adjacent depression, the retaining arm is allowed to flex back into position, being urged upwardly by the spring. The resilience of the retaining arm and the spring provides sufficient force to maintain the fastener in the selected position until enough force is applied to slide the fastener into another position. The fastener can be moved to, and retained in, different locations in the slot in order to find the optimal fit before it is securely torqued.

11 Claims, 2 Drawing Sheets

ADJUSTABLE POSITION RETAINING/MOUNTING APERTURE

FIELD OF THE INVENTION

The present invention relates generally to retaining/mounting apertures for fasteners. More particularly, the present invention relates to such retaining/mounting apertures which are used for the retention/mounting of plural parts such as vehicle body parts. Specifically, the present invention relates to such apertures which permit the adjustment of a fastener relative to the aperture without the need to remove and reposition the fastener, thereby allowing the adjustment of one body part relative to another body part.

BACKGROUND OF THE INVENTION

In the manufacture of automotive vehicles it is often desirable and/or necessary to attain the best possible fit between plural body parts for aesthetic, aerodynamic, weatherproofing or other purposes. Because of variations in the manufacturing process and the stack-up tolerances of various vehicle parts it is often necessary to make various adjustments in the vehicle assembly process to ensure the best possible fit between plural body parts on a vehicle-by-vehicle basis. Accordingly, vehicle body parts are typically designed to allow for a certain range of adjustment in securing the part to the vehicle structure. This is commonly accomplished by use of adjustable fasteners and/or attachment points. Frequently the assembler must make several trial and error attempts in positioning one body part relative to another in order to attain the best possible fit before securing the part to the vehicle structure. For example, in the assembly of agricultural tractors the cowl cover to hood alignment is a critical visual joint. To provide the adjustment required for aligning the cowl to the hood, slots have been used in the cowl mounting flanges. To adjust the cowl to the hood, the cowl mounting hardware must be tightened to retain the cowl in position. The hood is then closed to check the alignment. If the cowl needs to be repositioned, the hood is opened, the hardware loosened, the cowl is repositioned, and the hardware is retightened. The hood is then closed again to recheck the alignment. If still further adjustment is needed the process is repeated until an acceptable fit is attained. However each time the hardware is loosened and torqued, the fastener and sheet metal are compromised and, the plastic parts are subjected to stress cycling.

Accordingly, there is a clear need in the art for a means for attaining the best possible fit between plural body parts without repeatedly loosening, repositioning and tightening the attachment fasteners.

SUMMARY OF THE INVENTION

In view of the foregoing, it is an object of the invention to provide a means for fastening plural body parts together and/or to a vehicle structure.

Another object of the invention is the provision of such a means which does not require repeated loosening, repositioning and tightening of the fastening means.

A further object of the invention is to provide such a means for fastening which does not otherwise stress or compromise the fastener or the structural material.

An additional object of the invention is the provision of a fastener aperture which permits the repositioning of a fastener in the aperture without the need to loosen, reposition and tighten the fastener.

A still further object of the invention is the provision of such a means which is readily and inexpensively produced using known manufacturing techniques and equipment and is compatible with known assembly methods.

The foregoing and other objects of the invention together with the advantages thereof over the known art which will become apparent from the detailed specification which follows are attained by an adjustable position retaining/mounting aperture for plastic parts comprising: an elongated slot having a first wall; a pair of flexible retaining arms each having a first wall with a plurality of depressions and ridges therein, the first walls of the retaining arms forming a second wall of the elongated slot; and, a spring adjacent to the retaining arms, the spring being deflected when a retaining arm is deflected from a normal position and the spring supplying a spring force to urge the retaining arm to return to the normal position; wherein a fastener inserted in the elongated slot is retained in one of the depressions by at least one of the retaining arms and when the fastener is moved at least one of the retaining arms is deflected to allow the fastener to ride over one of the ridges and into an adjacent depression.

Other objects of the invention are attained by a retaining device for providing a range of adjustment between a first part and a second part, the device comprising: an aperture provided in the first part, the aperture including an elongated slot defined by a first wall, and at least one retaining member, the retaining member having a plurality of depressions and ridges, the depressions and ridges defining a second wall of the elongated slot, the retaining member being flexible so as to be displaceable from a normal position; a resilient member provided in the aperture adjacent to the retaining member to urge the retaining member toward the normal position; and, a fastener disposed in the elongated slot, the fastener being secured to the second part; wherein a temporary application of force to one of the first or second parts is sufficient to cause the fastener to ride up one of the ridges thereby deflecting the at least one retaining member into contact with the resilient member until the fastener is seated in an adjacent depression and the fastener is retained in the depression by the retaining member and resilient member until force is again applied to one of the first or second parts to cause the fastener to move to the next adjacent depression.

In general, an adjustable position retaining/mounting aperture is provided having an elongated slot, a pair of retaining arms, and a spring. One wall of the elongated slot has a plurality of depressions and ridges, this scalloped wall also forms the upper walls of the retaining arms. The retaining arms are mirror images of one another, with each having a wide main body portion and a narrow neck portion. The aperture is designed for use with plastic materials and as such, the narrow neck portions of the arms serve as living hinges allowing the main body portions to flex within the aperture. The spring is adjacent to the retaining arms and comprises a thin strip of material in the form of an arch which flexes when one of the retaining arms is deflected enough to make contact with the spring. The arch shape of the spring tends to urge the retaining arms back to their original position. A fastener inserted in the aperture can be moved for purposes of adjustment, by sliding the fastener in the slot causing it to ride up one of the adjacent ridges. When the fastener rides up the ridge the retaining arm flexes at the neck portion and is deflected into contact with the spring causing it to deflect. As the fastener moves over the ridge and is seated in the adjacent depression, the retaining arm is allowed to flex back into position, being urged upwardly by the spring. The resilience of the retaining arm and the spring provides sufficient force to maintain the fastener in the selected position until enough force is applied to slide the fastener into another position. The fastener can be moved to, and retained in, different locations in the slot in order to find the optimal fit before it is securely torqued.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
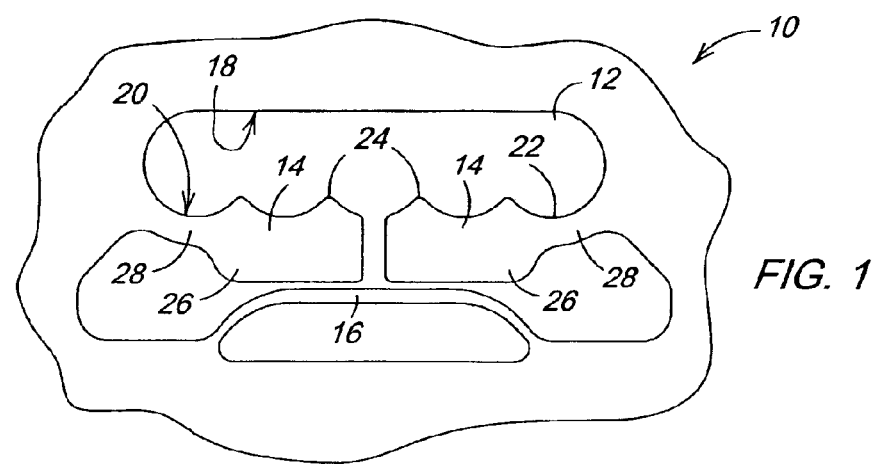
FIG. 1 is a plan view of an exemplary part having the aperture of the present invention.

With reference now to the drawings it can be seen that an adjustable position retaining/mounting aperture according to the invention is designated generally by the numeral 10. As can best be seen in FIG. 1 the aperture 10 is comprised generally of an elongated slot portion 12, a pair of retaining arms 14, and a spring portion 16. Elongated slot portion 12, as viewed in the drawings, has a straight upper wall 18 while the scalloped lower wall 20 is characterized by a plurality of depressions 22 and ridges 24 formed on an upper wall of the retaining arms 14. It can be seen that retaining arms 14 are essentially mirror images of one another, with each having a relatively wide main body portion 26 and a relatively narrow neck portion 28. Because aperture 10 is designed for use with thermoplastic and thermoset materials the narrow neck portions 28 of arms 14 serve as living hinges allowing the main body portions 26 to flex within the aperture 10. A support spring 16 is provided in the aperture 10 below the retaining arms 14 as viewed in the drawings. Support spring 16 comprises a thin strip of material generally in the form of an arch. The material forming the spring 16 is thin enough that the spring 16 will flex when one of the retaining arms 14 is downwardly deflected enough to make contact with the spring 16. The arch shape of the spring 16 tends to urge the spring 16 back to its original position thereby urging the retaining arms 14 back to their original position.

Figure 2:
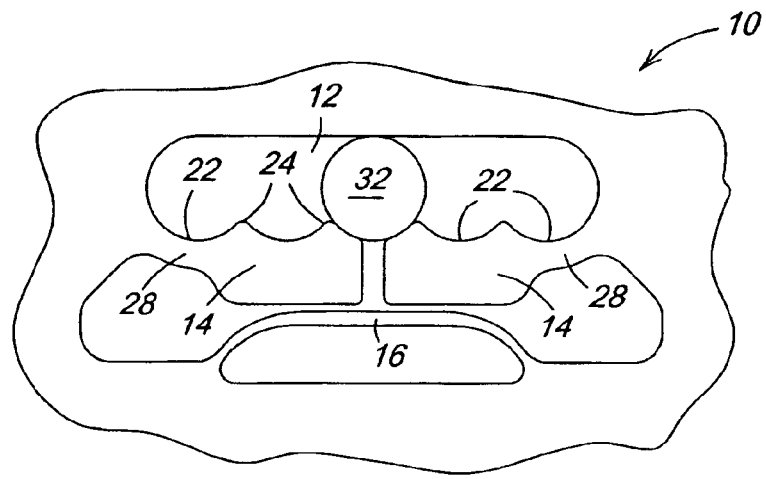
FIG. 2 is a view of the part of FIG. 1 with an appropriate fastener fitted in the aperture.
Figure 3:
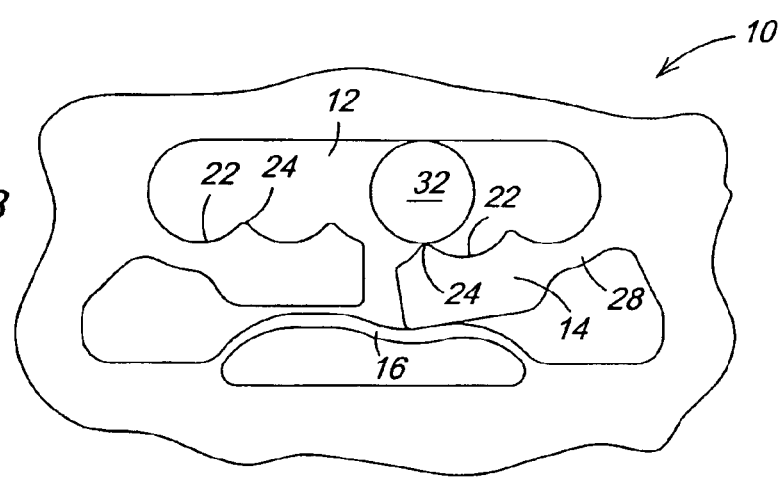
FIG. 3 is a view of the part as in FIG. 2 with the fastener in transition from one position to another.
Figure 4:
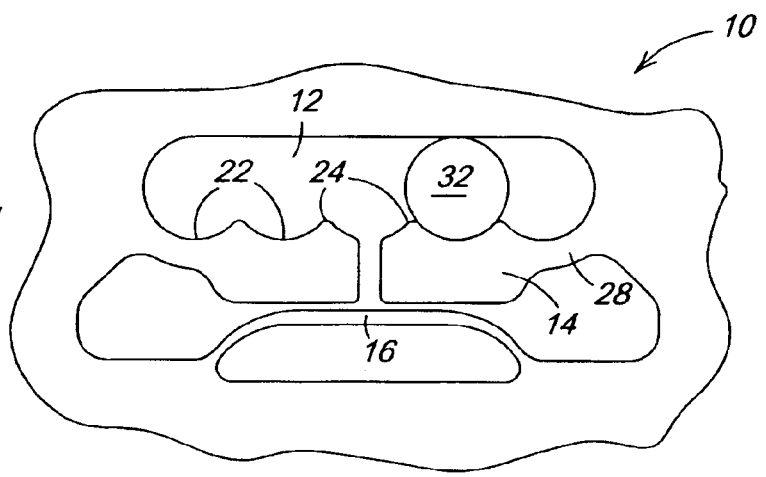
FIG. 4 is a view of the part as in FIG. 2 with the fastener in an alternate position.

Referring now to FIGS. 2–4 the operation of the invention can be seen. More particularly in FIG. 2 the aperture 10 is shown with a fastener 32 inserted therein. The diameter of the fastener 32 corresponds to the diameters formed by each of the depressions 22. If it is desired to move the fastener 32 for purposes of adjustment, the fastener 32 is simply slid horizontally as viewed in the drawings such that the fastener rides up one of the adjacent ridges 24. As is perhaps best shown in FIG. 3 when the fastener rides up the ridge 24 the retaining arm 14 flexes at the neck portion 28 and is deflected downwardly as viewed in the drawings. The retaining arm 14 eventually contacts the spring 16 causing the spring 16 to deflect. When, as in FIG. 4, the fastener 32 moves over the ridge 24 and is seated in the adjacent depression 22 the retaining arm 14 is allowed to flex back into position and is further urged upwardly by the spring 16. The width of the slot portion 12 and the number of depressions 22 is determined by the total adjustment range required for the particular application, with the center of the slot 12 being the nominal position. The resilience of the retaining arms 14 and the spring 16 provides sufficient force to maintain the fastener 32 in the selected position until such time that a greater force is applied to slide the fastener 32 into another position. Thus the fastener 32 can be moved to, and retained in, different locations in the slot 12 in order to find the optimal fit before it is securely torqued. Once this optimal fit is achieved the fastener 32 can be appropriately torqued thereby preventing further movement in the slot 12.

Figure 5:
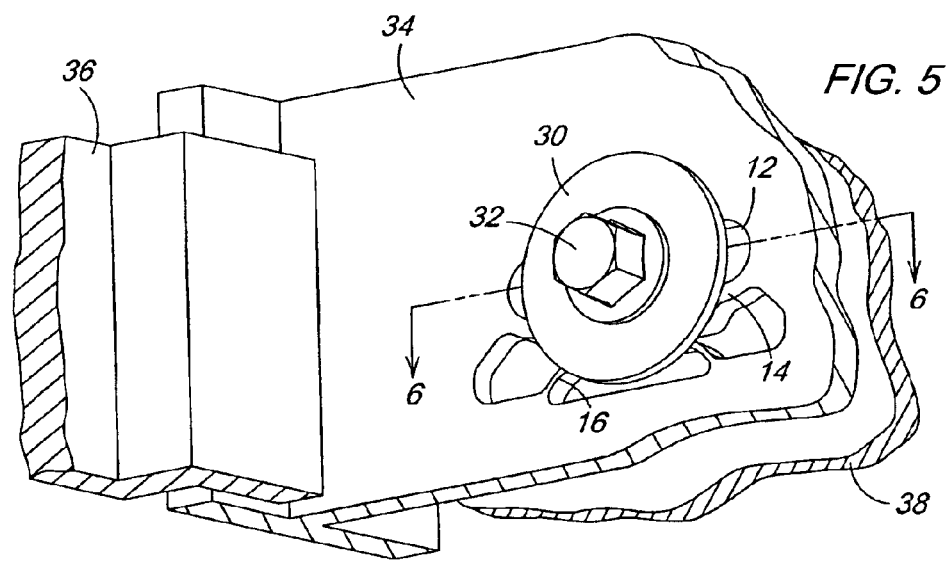
FIG. 5 is a perspective view of an assembly of plural parts wherein one part has an aperture according to the invention
Figure 6:
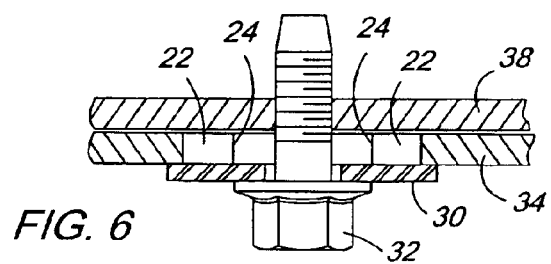
FIG. 6 is a cross-sectional view of the assembly of FIG. 5 taken along the line 6—6.

For purposes of illustration the operation of the invention will now be described with respect to the assembly of an agricultural tractor hood 36 to a cowl 34, the cowl 34 being injection molded plastic with the aperture 10 of the invention molded therein. With reference to FIGS. 5 and 6, and also by continued reference to FIGS. 2–4 it can be seen that the fastener 32 with a washer 30 is inserted through the slot 12 of the aperture 10 in the center or nominal position. The fastener 32 is then started into a sheet metal pilot hole in a cowl support structure 38 to support the cowl 34 on the vehicle. The fastener 32 is not tightened at this time. Next the hood 36 is installed and closed and the position of the cowl 34 relative to the hood 36 is adjusted by applying pressure on the cowl outer surface so as to move the cowl 34 relative to the cowl support structure 38. As pressure is applied to the cowl 34, the fastener 32 is unseated from the nominal position and rides up an adjacent ridge 24 deflecting one of the retaining arms 14 and spring 16 until such time that the fastener 32 is seated in the adjacent depression 22, at which time the retaining arm 14 is urged back to its nominal position by the spring 16. Further pressure can be applied to the cowl 34 to move the fastener 32 to the next adjacent depression 22 until the optimal fit between the cowl 34 and hood 36 is achieved. When the cowl to hood alignment is acceptable the retaining arm 14 and spring 16 maintain the position of the fastener 32 in the aperture 10 until the hood 36 is raised and the hardware tightened to the specified torque thus securing the cowl 34 in place to the cowl support structure 38. Thus the cowl to hood alignment is completed without multiple adjustments and torque being repeatedly applied to the hardware and plastic components.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. An adjustable position retaining/mounting aperture for plastic parts comprising:

an elongated slot having a first wall;

a pair of flexible retaining arms each having a first wall with a plurality of depressions and ridges therein, the first walls of the retaining arms forming a second wall of the elongated slot; and, a spring adjacent to the retaining arms, the spring being deflected when a retaining arm is deflected from a normal position and the spring supplying a spring force to urge the retaining arm to return to the normal position;

wherein a fastener inserted in the elongated slot is retained in one of the depressions by at least one of the retaining arms and when the fastener is moved at least one of the retaining arms is deflected to allow the fastener to ride over one of the ridges and into an adjacent depression.

2. An adjustable position retaining/mounting aperture for plastic parts as described in claim 1 wherein:

a diameter defined by each depression and the first wall of the elongated slot when the retaining arms are in the normal position corresponds closely to a diameter of the fastener.

3. An adjustable position retaining/mounting aperture for plastic parts as described in claim 1 wherein:

the spring comprises a thin strip of material in the general shape of an arch, a portion of the arch being adjacent to each of the retaining arms.

4. An adjustable position retaining/mounting aperture for plastic parts as described in claim 1 wherein:

the retaining arms each comprise a relatively narrow neck portion and a relatively wide main body portion, a first wall of the main body portion being defined by the ridges and depressions, the narrow neck portion being flexible so as to act as a living hinge for the main body portion.

5. An adjustable position retaining/mounting aperture for plastic parts as described in claim 4 wherein:

the retaining arm flexes at the narrow neck portion when the fastener is displaced so that the fastener rides up one of the ridges thereby deflecting the main body portion of the retaining arm into contact with the spring.

6. An adjustable position retaining/mounting aperture for plastic parts as described in claim 1 wherein:

the aperture is provided in a first plastic part and the fastener is also secured to a second part whereby a range of adjustment is provided between the first part and the second part.

7. An adjustable position retaining/mounting aperture for plastic parts as described in claim 6 wherein:

a lengthwise dimension of the elongated slot is equal to a desired total range of adjustment between the first part and the second part.

8. An adjustable position retaining/mounting aperture for plastic parts as described in claim 6 wherein:

a temporary application of force to one of the first part or the second part is sufficient to displace the fastener into an adjacent depression and the retaining arm and spring act together to maintain the fastener in the depression until such time that force is again applied to displace the fastener into the next adjacent depression, whereby adjustment is made between the first part and the seconds part without removal of the fastener.

9. A retaining device for providing a range of adjustment between a first part and a second part, the device comprising:

an aperture provided in the first part, the aperture including an elongated slot defined by a first wall and at least one retaining member, the retaining member having a plurality of depressions and ridges, the depressions and ridges defining a second wall of the elongated slot, the retaining member being flexible so as to be displaceable from a normal position;

a resilient member provided in the aperture adjacent to the retaining member to urge the retaining member toward the normal position; and, a fastener disposed in the elongated slot, the fastener being secured to the second part;

wherein a temporary application of force to one of the first or second parts is sufficient to cause the fastener to ride up one of the ridges thereby deflecting the at least one retaining member into contact with the resilient member until the fastener is seated in an adjacent depression and the fastener is retained in the depression by the retaining member and resilient member until force is again applied to one of the first or second parts to cause the fastener to move to the next adjacent depression.

10. A retaining device for providing a range of adjustment between a first part and a second part, as described in claim 9 wherein a diameter defined by each of the depressions and the first wall of the elongated slot when the retaining member is in a normal position closely corresponds to a diameter of the fastener.

11. A retaining device for providing a range of adjustment between a first part and a second part, as described in claim 9 wherein a lengthwise dimension of the elongated slot is equal to a desired total range of adjustment between the first part and the second part.

* * * * *